United States Patent [19]
Forrest

[11] Patent Number: 5,383,025
[45] Date of Patent: Jan. 17, 1995

[54] OPTICAL SURFACE FLATNESS MEASUREMENT APPARATUS

[75] Inventor: Andrew Forrest, London, England

[73] Assignee: European Vision Systems Centre Limited, London, England

[21] Appl. No.: 958,111

[22] PCT Filed: Apr. 23, 1991

[86] PCT No.: PCT/GB91/00648
§ 371 Date: Dec. 23, 1992
§ 102(e) Date: Dec. 23, 1992

[87] PCT Pub. No.: WO91/16602
PCT Pub. Date: Oct. 31, 1991

[30] Foreign Application Priority Data
Apr. 23, 1990 [GB] United Kingdom ............... 9009110

[51] Int. Cl.6 ............................................. G01B 11/30
[52] U.S. Cl. ..................................... 356/371; 356/376; 250/237 G
[58] Field of Search ............... 356/371, 376; 250/237 G

[56] References Cited

U.S. PATENT DOCUMENTS
2,867,149  1/1959  Goddard ................. 356/371
3,858,981  1/1975  Jaerisch et al. ......... 250/237 G

FOREIGN PATENT DOCUMENTS
22858   2/1979  Japan ................. 356/376
157507  9/1984  Japan ................. 356/376

OTHER PUBLICATIONS
Dehmel, S.P.I.E. Journal, vol. 5, Feb.–Mar. 1967, pp. 91–94.
Harrison, IBM Technical Disclosure Bulletin, vol. 12, No. 10, Mar. 1970, p. 1643.

Primary Examiner—F. L. Evans
Attorney, Agent, or Firm—Pollock, Vande Sande & Priddy

[57] ABSTRACT

The flatness of at least a portion of a substantially planar surface (16) is measured by illuminating the surface through a beam splitter (12) incorporating a grid (13) or other patterned shield. The light pattern reflected from the surface (16) is directed by way of a reflector (14) back through the beam splitter (12) and thus through the grid (13). The image exiting the beam splitter (12) has characteristics representative of the flatness of the surface.

17 Claims, 3 Drawing Sheets ptical

OPTICAL SURFACE FLATNESS MEASUREMENT APPARATUS

FIELD OF THE INVENTION

This invention concerns improvements relating to optical measuring and monitoring systems, in particular systems for determining or investigating the degree of flatness of a reflective or non-reflective surface, for example the surface of a ceramic tile or substrate or a semiconductor wafer.

BACKGROUND OF THE INVENTION

Moiré fringe measurement systems are commonly used when three-dimensional measurements are to be made on almost flat objects. True interferometry, is used when the deviation from flat is comparable in size to the wavelength of light, but this technique is normally much too fine for engineering purposes The Moiré fringe technique allows much coarser measurements to be made. The technique operates by projecting a pattern of fine equally spaced lines onto the object under test and viewing the reflected image with a camera which has a grid over its sensor, such that for a perfectly flat object the image of the bright lines always falls on the sensor grid and not en the spaces between the grids, so that the image light does not access the sensitive surface of the sensor. Any deviation from flat causes some of the image of the bright lines to fall on the sensor surface. The deviations are thus recorded as lighter areas. For larger deviations, the image of the bright line will again fall on an opaque grid. The net result of this is that a contour plot type of result can be obtained with each contour corresponding to one period of the grid. How this relates to actual depth is determined by the spacing of the grids, the focal lengths of the imaging systems and the angle of incidence of the projection and viewing system. The grid need not be a set of lines but may be any pattern by which an image can be transmitted onto the surface of the object. By careful selection, the pattern can be used for special purposes such as varying the resolution of the field of view. By the use of different grids, it is possible to produce a wide range of sensitivities more appropriate to engineering uses than purely optical interference systems, and also not needing monochromatic or near monochromatic light as do purely optical interference systems.

A schematic of a typical design of a prior art Moiré system, is shown in FIG. 1 of the accompanying drawings. A grid 1 is imaged on a test piece 2 by means of projection optics 3. A second grid 4 is used in the imaging system 5, and this grid is re-imaged on the photosensor of a camera 6. It is usually not practical to place the grid 4 directly on the sensor. To use the system, the projection and imaging optics must first be carefully aligned by use of a flat test object. There are very many degrees of freedom in the system and, in order for it to work efficiently, the projections of the two grids on the test object must coincide exactly. Taking the camera as fixed, the projection optics 3 must be correctly aligned in three angles and two distances. All the angles and distances are not along convenient orthogonal axes. If adjustments using axes orthogonal to the test piece are used, the adjustments will be highly interactive and hence difficult and time consuming. A further significant disadvantage of the system is that it needs two grids. To change the grid spacing thus requires two new grids, and again the grids must be accurately aligned with one another. Generally, the use and especially the setting up of such a system is much more complicated and difficult than most industrial users are prepared to tolerate.

SUMMARY OF THE INVENTION

The present invention provides a system that uses only one grid, is easy to set up and can handle objects at a range of angles to the system, so that small changes in the mechanical set-up do not require complete realignment. In accordance with the teachings of the present invention, the single grid is used by both the projection and imaging sides of the optics, a beam splitter type arrangement being the simplest, though possibly not the only way to do this.

BRIEF DESCRIPTION OF THE DRAWINGS

The invention will best be appreciated from the following description, given with reference to the accompanying drawings, wherein.

DESCRIPTION OF PREFERRED EMBODIMENT

Figure 1:
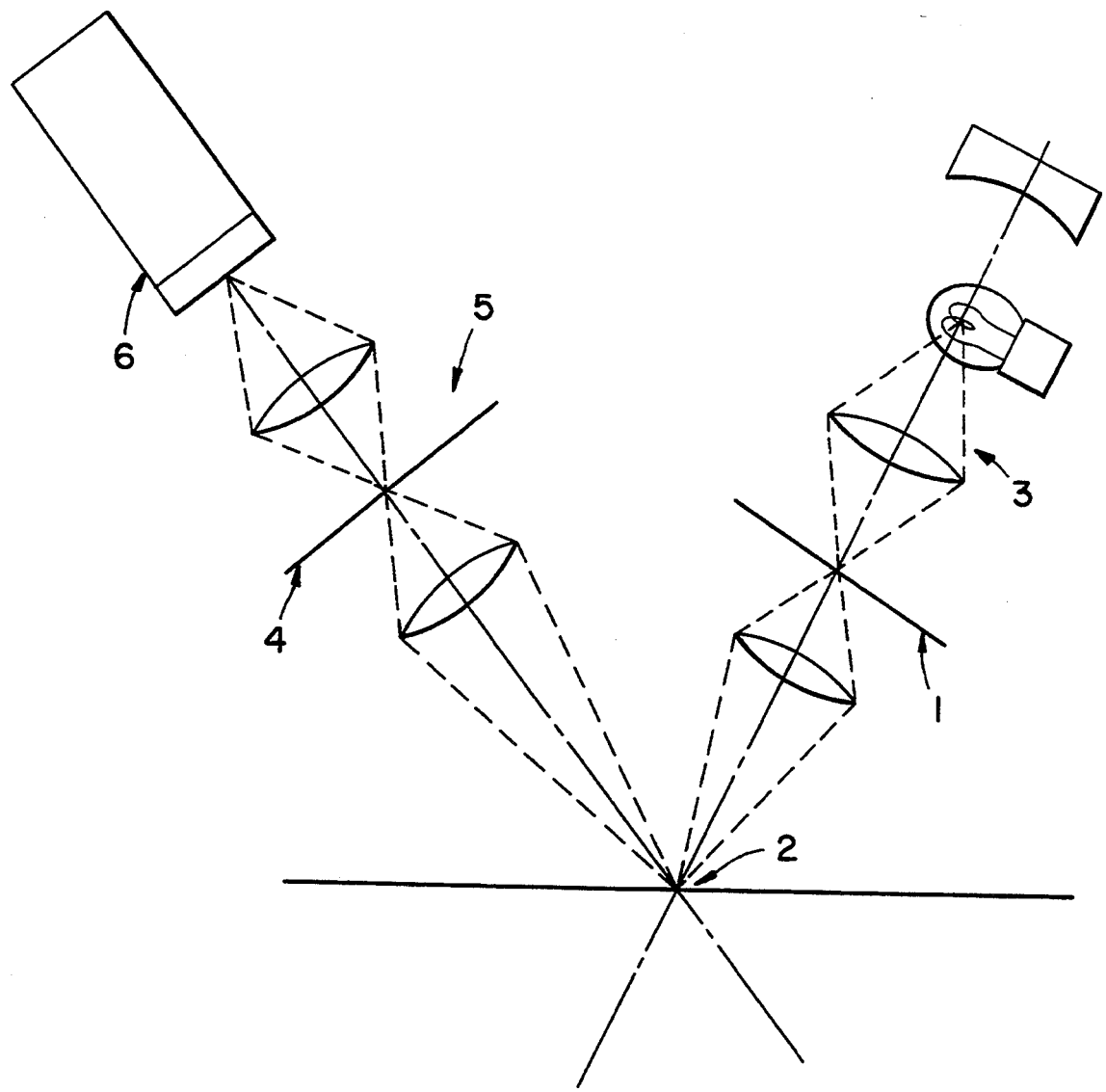
FIG. 1 is a schematic illustration of a conventional Moir/e,acu/e/ system as described hereinbefore.
Figure 2:
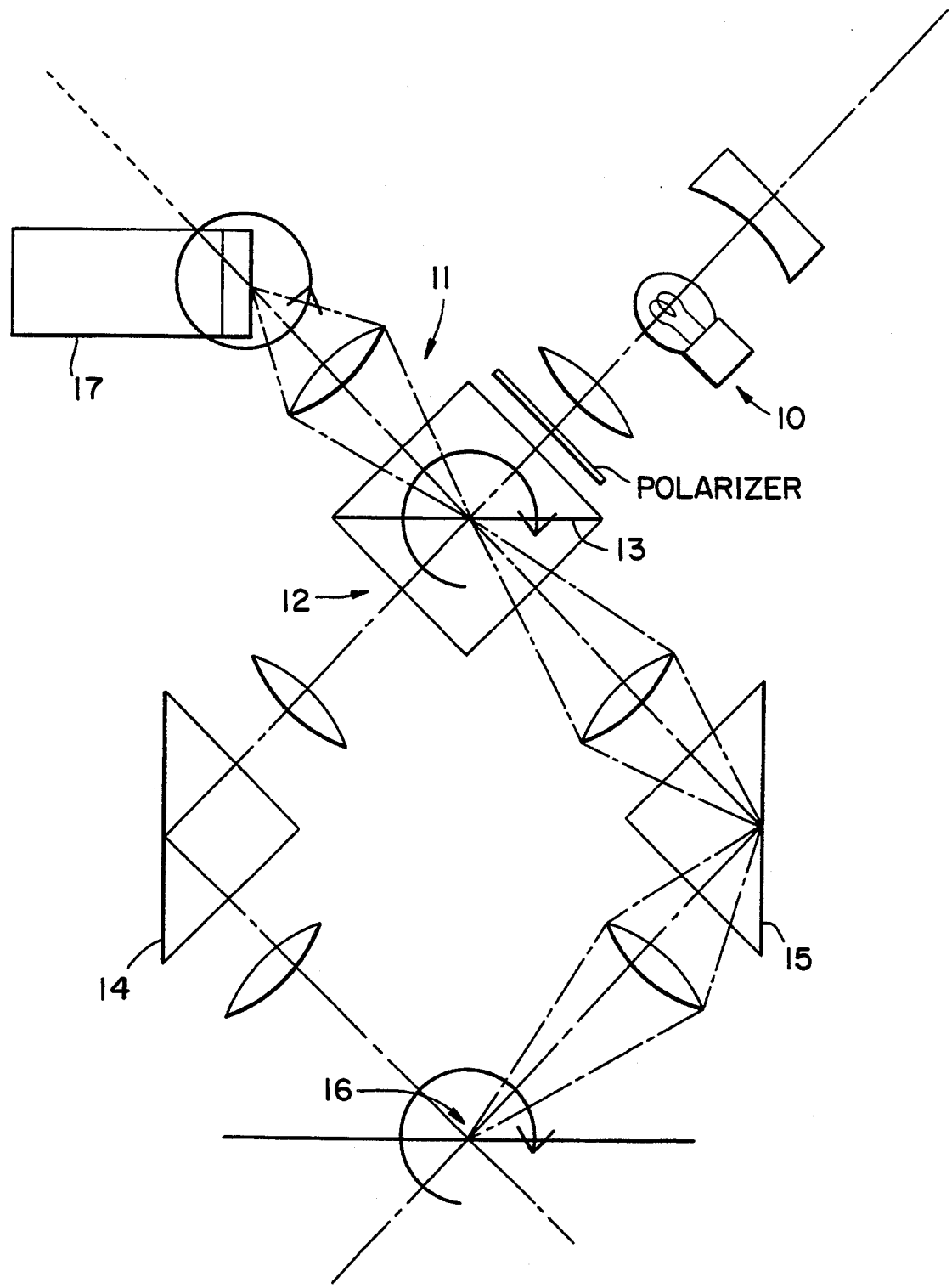
FIG. 2 is a schematic illustration of an exemplary embodiment of the present invention.

Referring to FIG. 2, the projection optics are shown at 10 and the imaging optics at 11. The projection and imaging optics both make use of a beam splitter 12 incorporating a grid 13. On the opposite sides of the beam splitter with respect to the projection and imaging optics, there are provided respective prism reflectors 14 and 15. The surface under investigation is designated 16 and a CCD camera is designated 17.

Because of the use of a beam-splitter, the object being imaged, namely the grid 13, is at an oblique angle to the optical axis. This would at first sight seem to give rise to problems, but if one traces through the optical system as shown in FIG. 2, one can see that the grid is perfectly imaged on the object because the object is also at the exact same angle to the optical axis. Because the system is completely symmetrical, this argument applies equally to the projection of the grid and the imaging system. The alignment of the two beams is therefore inevitably assured.

The arrangement of FIG. 2 thus fulfils the requirements of the invention. It uses only one grid and it is relatively easy to set up. The relative positions of the optical components may advantageously be fixed so that the only requirement is to locate the object 16 in the correct angular orientation and at the right distance from the optics.

To make the system more flexible, the grid can be arranged to be rotatable, as indicated in FIG. 2 by the arrow superimposed on the beam splitter 12. The system will remain correctly aligned if the object under examination is tilted by the same amount in the same direction and the camera is rotated in the opposite direction by the same amount. The included angle of beam at the surface of the object stays constant, but the angle of incidence is now no longer the same as the angle of reflection, so that specular reflection from the object surface, which otherwise could possibly cause problems, would be reduced. The rotations of the beam splitter, the object and the camera could be interlinked in an automatic arrangement.

Since there is a direct optical path from the projection optics 10 to the camera 17, the use of the illustrated symmetrical arrangement can cause light to be specularly reflected directly into the camera without going anywhere near the test object. It is desirable, therefore, that the grid should have the absolute minimum reflectance, say, of about 1%. This problem could be eased by using polarization. If the polarization of the projector is opposite to that of the camera, this will produce a substantial reduction in the directly reflected light. This solution is, however, not as attractive as it first appears because the light reflected from the object will carry the same polarization as that from the projection optics, so that, in order for the camera to see the reflected light, a polarization rotation would have to be arranged between the object and the return through the grid. This would add considerable complexity and cost.

An alternative solution would be to use laser illumination. The laser light entering the instrument is essentially at one angle, so that, if the grid was made reflective and the angle that the direct reflection from the grid made was outside the acceptance angle of the camera, substantially no light would enter the camera from the direct path. This would prevent the use of the instrument at equal incident and reflective angles, i.e., the specular case, but this would be no significant disadvantage. This solution would be easy to implement, only requiring a laser and beam expander.

Figure 3:
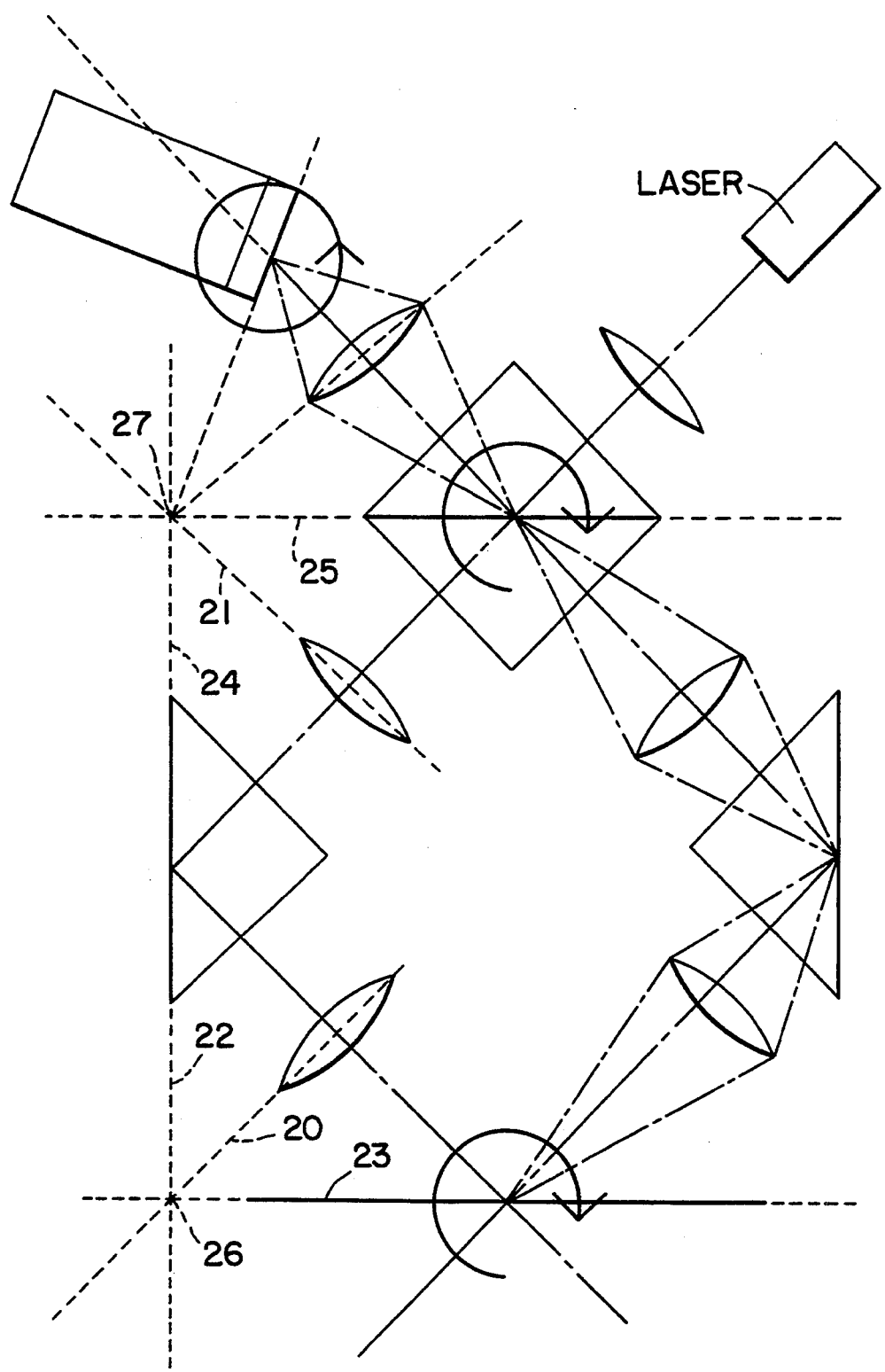
FIG. 3 is a schematic illustration of the Scheimpflug condition.

The arrangement of FIG. 2 requires the grid 13 to be of substantially the same size as the surface or surface portion of the object 16 being measured. The arrangement also requires both the grid 13 and the object surface to be substantially at right angles to the reflecting surface of each prism reflector 14, 15. If this condition is not satisfied, a loss of image quality results. With magnification built into the optical system, the problem is proportionately worsened. In order to overcome this limitation the arrangement should be configured as shown in FIG. 3, where the optical system is arranged so that for each lens a notional line, e.g., line 20 or line 21, drawn through the lens as shown, and notional lines 22, 23 or 24, 25 through the plane of each image associated with the lens, cross at a point 26 or 27, the so-called "Scheimpflug" condition. By satisfying the Scheimpflug condition, the system overcomes or at least reduces the above-mentioned problems.

It is possible to dispense with the two lenses nearest the object at the expense of using bigger prisms.

I claim:

1. A device for measuring the flatness of at least a portion of a substantially planar surface, the device comprising a beam splitter incorporating a grid through which light is directed to illuminate said surface, the device being arranged such that light reflected from the surface is directed through the beam splitter, and thus through the grid, to exit therefrom with characteristics representative of the flatness of said surface.

2. A device as claimed in claim 1, further comprising a light source for the illumination of said surface through said grid.

3. A device as claimed in claim 2, wherein said light source comprises a laser.

4. A device as claimed in claim 2, further comprising a polariser for polarizing light from said light source.

5. A device as claimed in claim 4, further comprising a sensor for sensing the reflected light exiting from said beam splitter.

6. A device as claimed in claim 5, wherein said sensor comprises a CCD device for detecting the intensity of light incident thereon.

7. A device as claimed in claim 5 or 6, wherein the relative angular positions of the sensor and the beam splitter are adjustable.

8. A device as claimed in claim 1, wherein the grid comprises a plurality of equally spaced lines.

9. A device as claimed in claim 8, wherein the grid comprises a plurality of lines of equal width.

10. A device as claimed in claim 9, wherein the grid is replaceable by other grids.

11. An apparatus for measuring deviations from the plane of a substantially planar surface, the apparatus comprising a light source, a grid, projection optics associated with said light source for illuminating said planar surface through said grid such that an image of the grid is projected onto the surface, a sensor, and imaging optics associated with said sensor for viewing through the grid said image of the grid that is protected onto said surface by said projection optics, whereby the sensor views only a proportion of the image that is projected onto said surface, such proportion being representative of the deviation of the surface from the plane.

12. An apparatus as claimed in claim 11, wherein the light source provides coherent light for illuminating said surface thereby to reduce specular reflections.

13. An apparatus as claimed in claim 12, wherein the light source comprises a laser.

14. An apparatus as claimed in claim 11 wherein the relative orientation of the surface, the light source and the grid is variable.

15. An apparatus as claimed in claim 11 wherein the sensor comprises a CCD camera which outputs a signal for processing, said signal being representative of the deviation of the surface from the plane.

16. A device for measuring the flatness of at least a portion of a substantially planar surface, the device comprising a beam splitter incorporating a patterned shield through which light is directed to illuminate said surface, the device being arranged such that light reflected from the surface is directed through the beam splitter, and thus through the patterned shield, to exit therefrom with characteristics representative of the flatness of said surface.

17. An apparatus for measuring deviations from the plane of a substantially planar surface, the apparatus comprising a light source, a patterned shield, projection optics associated with said light source for illuminating said planar surface through said patterned shield such that an image of the patterned shield is projected onto the surface, a sensor, and imaging optics associated with said sensor for viewing through the patterned shield said image of the patterned shield that is projected onto said surface by said projection optics, whereby the sensor views only a proportion of the image that is projected onto said surface, such proportion being representative of the deviation of the surface from the plane.

* * * * *